(12) United States Patent
Murakami

(10) Patent No.: US 12,042,936 B2
(45) Date of Patent: Jul. 23, 2024

(54) ROBOT JOINT STRUCTURE AND ROBOT WITH BACKLASH REDUCTION MECHANISM

(71) Applicant: FANUC CORPORATION, Yamanashi (JP)

(72) Inventor: Kunihiko Murakami, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 801 days.

(21) Appl. No.: 16/744,285

(22) Filed: Jan. 16, 2020

(65) Prior Publication Data

US 2020/0230809 A1 Jul. 23, 2020

(30) Foreign Application Priority Data

Jan. 23, 2019 (JP) .................................. 2019-009630

(51) Int. Cl.
| | | |
|---|---|---|
| *B25J 9/10* | (2006.01) | |
| *B25J 9/04* | (2006.01) | |
| *F16H 57/12* | (2006.01) | |

(52) U.S. Cl.
CPC .............. *B25J 9/103* (2013.01); *B25J 9/042* (2013.01); *F16H 57/12* (2013.01); *F16H 2057/125* (2013.01)

(58) Field of Classification Search
CPC . B25J 9/103; B25J 9/042; F16H 57/12; F16H 2057/125
See application file for complete search history.

(56) References Cited

U.S. PATENT DOCUMENTS

| | | | | |
|---|---|---|---|---|
| 4,972,735 A | * | 11/1990 | Torii | ..................... B25J 17/0283 901/29 |
| 7,909,722 B2 | * | 3/2011 | Hibino | ...................... B25J 9/102 475/168 |
| 8,215,198 B2 | * | 7/2012 | Masuo | ..................... B23F 23/10 74/409 |
| 8,413,540 B2 | * | 4/2013 | Long | ........................ B25J 18/00 74/421 A |
| 8,435,149 B2 | * | 5/2013 | Koyama | .................. B25J 9/102 475/162 |
| 9,321,179 B2 | * | 4/2016 | Inoue | ....................... F16H 1/145 |
| 9,726,272 B2 | * | 8/2017 | Bell | ..................... F04C 15/0061 |
| 2009/0019961 A1 | * | 1/2009 | Kobayashi | ................ F16H 1/32 901/29 |

(Continued)

FOREIGN PATENT DOCUMENTS

| | | | | |
|---|---|---|---|---|
| CN | 202781188 U | * | 3/2013 | |
| CN | 107055417 A | * | 8/2017 | |

(Continued)

*Primary Examiner* — Bobby Rushing, Jr.
(74) *Attorney, Agent, or Firm* — HAUPTMAN HAM, LLP

(57) ABSTRACT

A robot joint structure includes a motor configured to be used for a robot joint shaft capable of turning about a vertical axis, a motor-side gear mounted on a shaft of the motor, an auxiliary bearing configured to axially support the shaft supplementally, an adapter configured to integrate the motor, the motor-side gear, and the auxiliary bearing, and a moving mechanism configured to move a unit structure integrated by the adaptor in a radial direction of the motor such that the motor-side gear approaches a mating gear meshing with the motor-side gear.

16 Claims, 7 Drawing Sheets

(56) References Cited

U.S. PATENT DOCUMENTS

| | | | |
|---|---|---|---|
| 2016/0136819 A1* | 5/2016 | Kitahara | H01L 21/67766 |
| | | | 901/14 |
| 2016/0297066 A1* | 10/2016 | Takikawa | B25J 17/00 |
| 2019/0154131 A1* | 5/2019 | Migliori | B25J 9/0009 |

FOREIGN PATENT DOCUMENTS

| | | | |
|---|---|---|---|
| EP | 0174619 A2 * | 3/1986 |
| JP | 1252387 * | 10/1989 |
| JP | H03-73436 B2 | 11/1991 |
| JP | H811079 A | 1/1996 |
| JP | H8159241 A | 6/1996 |
| JP | H9-193815 A | 7/1997 |
| JP | 3488899 B2 * | 1/2004 |
| JP | 200468961 A | 3/2004 |
| JP | 2005-76748 A | 3/2005 |
| JP | 2008-223812 A | 9/2008 |
| JP | 4148280 B2 * | 9/2008 |
| JP | 2008298212 A | 12/2008 |
| JP | 2009-74611 A | 4/2009 |
| JP | 201038220 A | 2/2010 |
| JP | 2010131712 A | 6/2010 |
| JP | 2010-143284 A | 7/2010 |
| JP | 2015-36186 A | 2/2015 |
| JP | 2016-199177 A | 12/2016 |
| JP | 2017-106533 A | 6/2017 |
| JP | 2017113837 A | 6/2017 |
| KR | 20140143958 A * | 12/2014 |

* cited by examiner

ROBOT JOINT STRUCTURE AND ROBOT WITH BACKLASH REDUCTION MECHANISM

RELATED APPLICATIONS

The present application claims priority of Japanese Application Number 2019-009630, filed on Jan. 23, 2019, the disclosure of which is hereby incorporated by reference herein in its entirety.

BACKGROUND OF THE INVENTION

1. Field of the Invention

The present invention relates to a robot, and particularly to a robot joint structure and a robot with a backlash reduction mechanism.

2. Description of the Related Art

In a laser application, a sealing application, or the like that performs processing while a robot is operating, the trajectory accuracy of the robot is directly transferred to the product accuracy, so that a high trajectory accuracy is required for the robot.

In many industrial robots such as vertical articulated robots and horizontal articulated robots, a drive method in which torque output from a servomotor is amplified by a speed reduction mechanism is adopted, but backlash existing in the speed reduction mechanism causes an error in the rotation between the motor shaft and the output shaft, which degrades the trajectory accuracy of the robot. As a related art for removing, reducing or adjusting such backlash, for example, Patent Documents 1 to 10 are known.

JP H03-73436 B discloses a mechanism configured to adjust a backlash between a pinion and a large gear by adjusting an adjustment screw to move a pinion of a skew bevel gear device in an axial direction.

JP 2008-223812 A discloses a mechanism configured to adjust a backlash between the conical gear and a large conical gear by adjusting a position of a positioning nut to move a conical gear in an axial direction.

JP 2005-76748 A discloses a mechanism in which respective bosses fixed to both ends of a first gear shaft is pressed against a spring to translate the first gear shaft in parallel, thereby reducing backlash between a gear provided on the first gear shaft and an output shaft gear.

JP H09-193815 A discloses an electric power steering device configured to adjust a backlash between a large bevel gear and a small bevel gear by moving the large bevel gear in an axial direction with a disc spring.

JP 2009-74611 A discloses a joint structure and a robot arm of a robot in which a support member supporting an urging shaft of a planetary gear is urged by a first elastic member toward a movable internal gear and a fixed internal gear, and backlash between the planetary gear and the movable internal gear and the fixed internal gear is removed and reduced.

JP 2010-143284 A discloses an electric power steering device in which, when the idler gear starts to rotate following the rotation of the driven gear, the idler gear having received a meshing reaction force from the driven gear moves toward the drive gear side along a predetermined direction parallel to a line connecting the rotation center of the drive gear and that of the driven gear, and there becomes almost no backlash amount between the idler gear and the drive gear.

JP 2015-36186 A discloses a horizontal articulated robot in which backlash in a power transmission path from a motor to a third arm is reduced by a harmonic drive (trade name).

JP 2016-199177 A discloses a power steering device in which a bearing of a worm shaft is urged by a coil spring to maintain the meshing state of the worm gear and reduce backlash.

JP 2017-106533 A discloses a hypoid reduction mechanism which includes 2 drive gears respectively coupled to the output shafts of 2 motors, and a driven gear driven by 2 drive gears, where the respective output shafts are parallel to each other, and the distance between the respective output shafts is smaller than the outer diameter of the driven gear.

SUMMARY OF THE INVENTION

In particular, it is important to reduce backlash because backlash existing on the joint shaft which is distant from the robot tip, for example, the first shaft of a vertical articulated robot, has a large influence on the robot trajectory accuracy. In addition, since gravity may not act on the gears of other joint shafts capable of turning about the vertical axis, for example, the fourth to sixth shafts of the vertical articulated robot, backlash existing on these joint shafts may also affect the robot trajectory accuracy. This also applies to the joint shaft of a horizontal articulated robot.

On the other hand, when the distance from a motor to a speed reduction gear mechanism is long and a motor shaft is extended, an auxiliary bearing may be mounted in order to reduce the load on the motor shaft and ensure rigidity, but since the position of the rotational shaft of the gear mounted on the motor shaft is fixed by the auxiliary bearing, it has been difficult to adjust the backlash between the motor-side gear and the mating gear.

Therefore, even when an auxiliary bearing is used for the motor of the robot joint shaft, there is a need for a technique for improving the trajectory accuracy of the robot by reducing the backlash between the motor-side gear and the mating gear.

An aspect of the present disclosure provides a robot joint structure, where the robot joint structure includes a motor configured to be used for a robot joint shaft capable of turning about a vertical axis, a motor-side gear mounted on a shaft of the motor, an auxiliary bearing configured to axially support the shaft supplementally, an adapter configured to integrate the motor, the motor-side gear, and the auxiliary bearing, and a moving mechanism configured to move a unit structure integrated by the adaptor in a radial direction of the motor such that the motor-side gear approaches a mating gear meshing with the motor-side gear.

DETAILED DESCRIPTION

Figure 1:
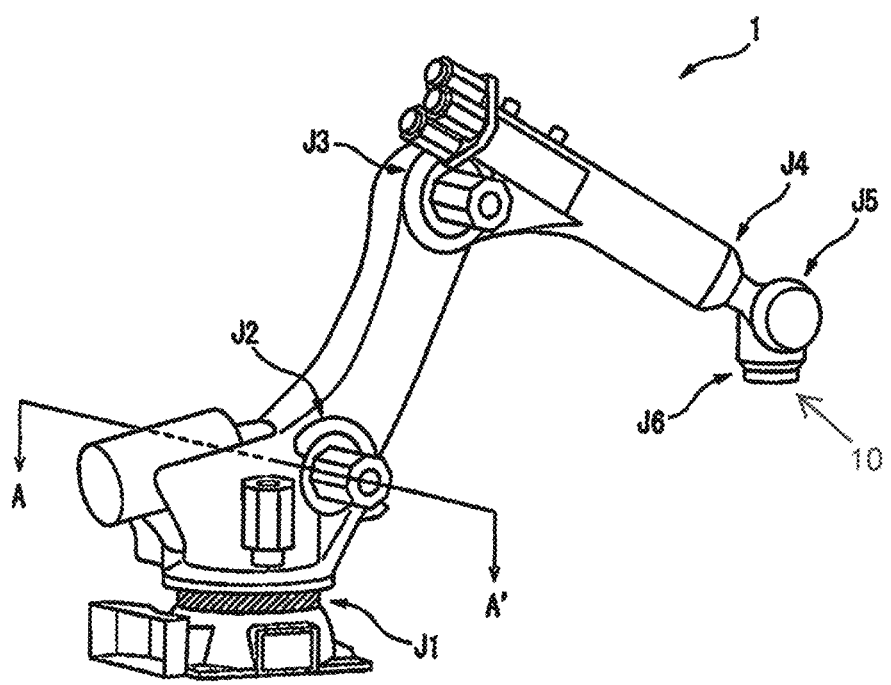
FIG. 1 is a perspective view illustrating a robot according to an embodiment.

Embodiments of the present disclosure will be described below in detail with reference to the accompanying drawings. In each drawing, the same or similar components are designated by the same or similar reference numerals. Furthermore, the embodiments described below do not limit the technical scope of the invention and the meaning of the terms described in the claims.

FIG. 1 is a perspective view of a robot 1 according to the present embodiment. Although the robot 1 of the present example is an industrial robot, particularly a vertical articulated robot, it should be noted that the present invention is not limited to this and can be applied to, for example, a horizontal articulated robot or the like. The robot 1 is used, for example, in a laser application, a sealing application, or the like, and various end effectors (not illustrated) are attached to the robot tip 10. As illustrated by reference numerals J1 to J6, the robot 1 includes six joint shafts. Since the first shaft J1 is a joint shaft which is the farthest from the robot tip 10 and turns about the vertical axis, the backlash existing on the first shaft J1 has the greatest influence on the robot trajectory accuracy. On the other hand, the second shaft J2 and the third shaft J3 are joint shafts turning about the horizontal axis, and since gravity acts on the gears of these joint shafts, the backlash existing on these joint shafts hardly affects the robot trajectory accuracy. Since the fourth shaft J4 to the sixth shaft J6 are joint shafts capable of turning about the vertical axis depending on the orientation of the robot, gravity may not act on the gears of these joint shafts, thus the backlash may affect the robot trajectory accuracy. Since the joint shaft of the horizontal articulated robot also turns about the vertical axis, the backlash of these joint shafts also affects the robot trajectory accuracy.

Figure 2:
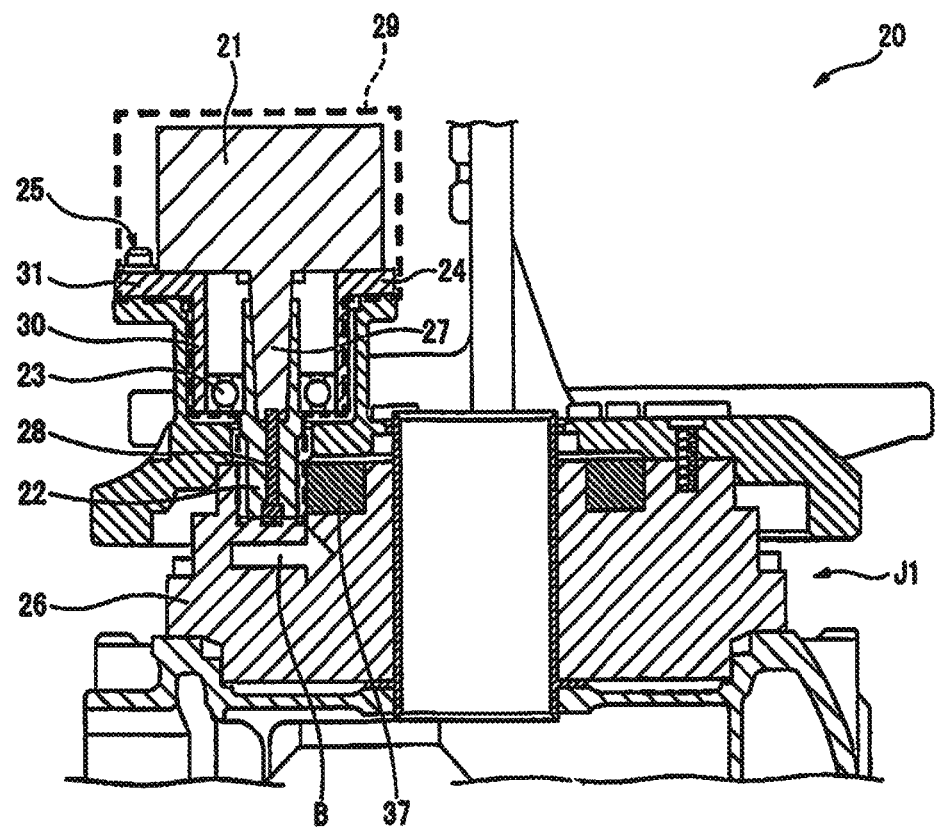
FIG. 2 is a cross-sectional view taken along A-A' illustrating a robot joint structure.

FIG. 2 is a cross-sectional view taken along A-A' illustrating a robot joint structure 20. Although the present example will be described based on the robot joint structure 20 of the first shaft J1, it should be noted that the present invention is not limited thereto. The robot joint structure 20 includes a motor 21, a motor-side gear 22, an auxiliary bearing 23, an adapter 24, and a moving mechanism 25. Although the motor 21 is used for driving the first shaft J1, since the distance from the motor 21 to the speed reduction mechanism 26 is long, an elongated motor-side gear 22 is attached to the shaft 27 of the motor 21 by a bolt 28, and the shaft 27 is extended. The auxiliary bearing 23 axially supports the shaft 27 supplementally to reduce the load on the shaft 27 and to secure the rigidity thereof. The adapter 24 includes a hollow cylindrical portion 30 and a flange 31 formed on one of the open ends of the cylindrical portion 30 in the circumferential direction. The motor 21 is attached to the flange 31, and the auxiliary bearing 23 is attached to the inner peripheral surface of the cylindrical portion 30. The motor 21, the motor-side gear 22, and the auxiliary bearing 23 are integrated by an adapter 24 to form a unit structure 29 as illustrated in broken lines. The unit structure 29 is movable in the radial direction B of the motor 21 by a moving mechanism 25 described later.

Figure 3A:
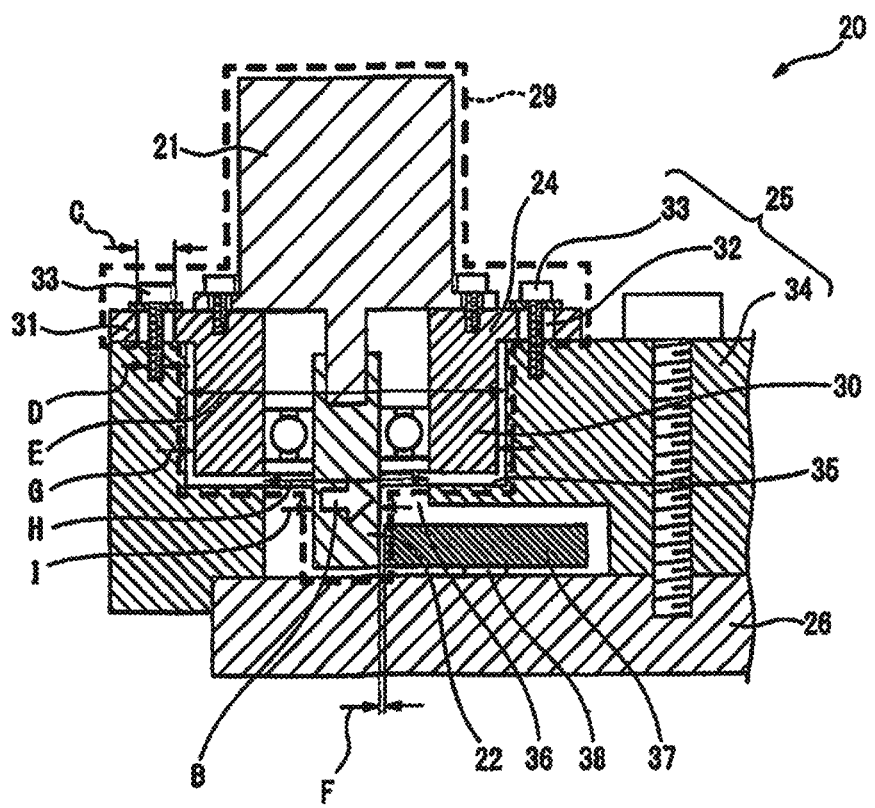
FIG. 3A is an enlarged cross-sectional view illustrating a robot joint structure before backlash reduction.
Figure 3B:
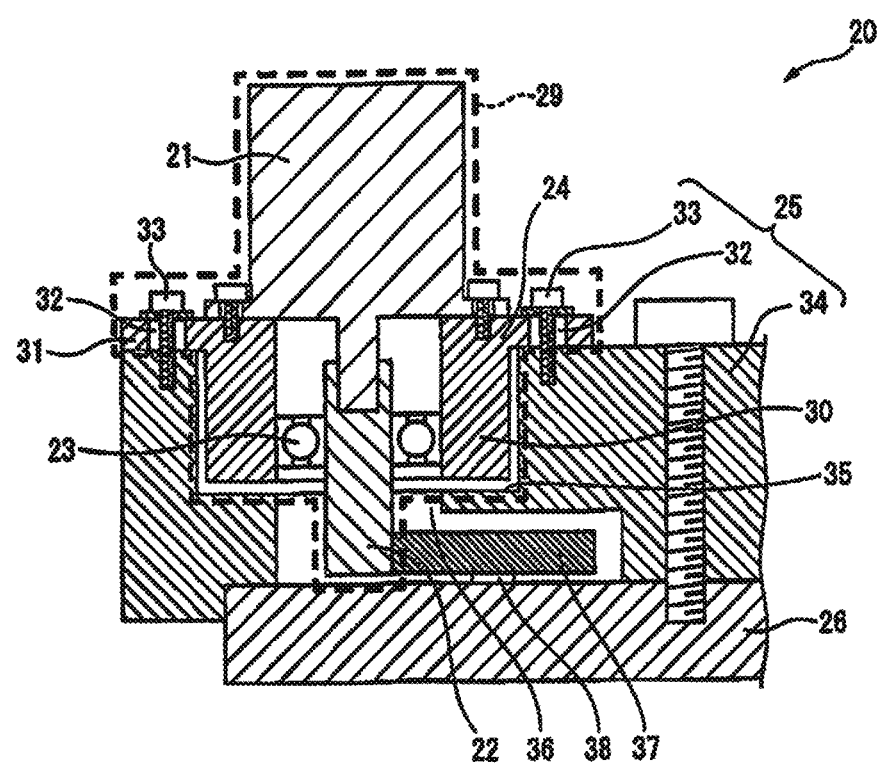
FIG. 3B is an enlarged cross-sectional view illustrating a robot joint structure after backlash reduction.

FIG. 3A is an enlarged cross-sectional view illustrating the robot joint structure 20 before the backlash reduction, and FIG. 3B is an enlarged cross-sectional view illustrating the robot joint structure 20 after the backlash reduction. The moving mechanism 25 of the present example includes a through hole 32, a fastening screw 33, and a robot arm member 34. The through hole 32 is formed in the flange 31 of the adapter 24, and the fastening screw 33 has an outer diameter D smaller than the inner diameter C of the through hole 32. This allows the unit structure 29 to be moveable relative to the robot arm member 34. The robot arm member 34 is a turning base on which the unit structure 29 is slidably disposed and may include a receiving groove 35 configured to receive the adapter 24. To make the unit structure 29 moveable, the inner diameter E of the receiving groove 35 is designed to be larger than the size obtained by adding the amount of movement F of the unit structure 29 to the outer diameter G of the received portion 30 (i.e., the cylindrical portion) of the adapter 24. Further, the robot arm member 34 may include an insertion hole 36 through which the motor-side gear 22 is inserted. In order to allow the unit structure 29 to be moveable, the inner diameter H of the insertion hole 36 is also designed to be larger than the size obtained by adding the amount of movement F of the unit structure 29 to the outer diameter I of the motor-side gear 22.

Such a moving mechanism 25 allows an operator to move the unit structure 29 in the radial direction B of the motor 21. As a result, the motor-side gear 22 approaches the mating gear 37 meshed with the motor-side gear 22 (see FIG. 3A). It should be noted that the mating gear 37 is a gear of the speed reduction mechanism 26 coupled to the robot arm member 34, but the present invention is not necessarily limited thereto. The receiving groove 35 may extend in a direction in which the motor-side gear 22 approaches the mating gear 37 so that the motor-side gear 22 reliably approaches the mating gear 37 when the operator moves the unit structure 29 in the radial direction B of the motor 21. After the unit structure 29 is moved in the radial direction B of the motor 21, the operator positions the unit structure 29 relative to the robot arm member 34 by the fastening screw 33 (see FIG. 3B). As a result, backlash between the motor-side gear 22 and the mating gear 37 is reduced, and the trajectory accuracy of the robot 1 is improved.

Figure 4:
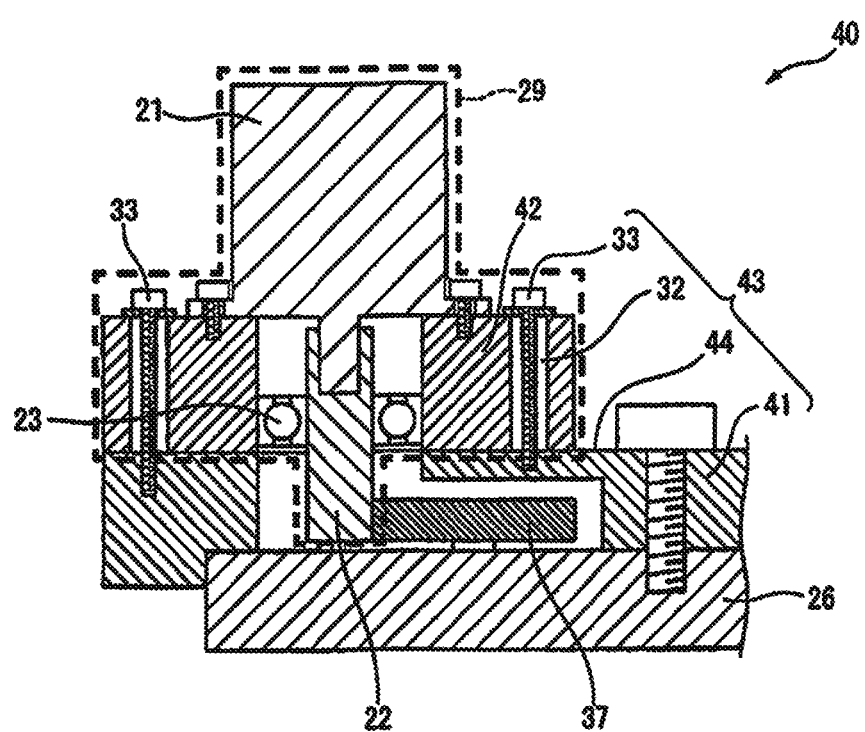
FIG. 4 is an enlarged cross-sectional view illustrating a modified example of a robot joint structure.

FIG. 4 is an enlarged cross-sectional view illustrating a modified example of the robot joint structure 20. The robot joint structure 40 of the present example is different from the robot joint structure 20 described above in that the robot arm member 41 does not include a receiving groove and the adapter 42 does not include a flange. In addition to the through hole 32 and the fastening screw 33, the moving mechanism 43 includes a robot arm member 41 including a sliding surface 44 on which the unit structure 29 slides. It is preferable that an arrow or the like (not illustrated) indicating the moving direction of the unit structure 29 is drawn on the sliding surface 44. Thus, when the operator moves the unit structure 29, the motor-side gear 22 can be easily brought close to the mating gear 37.

Figure 5:
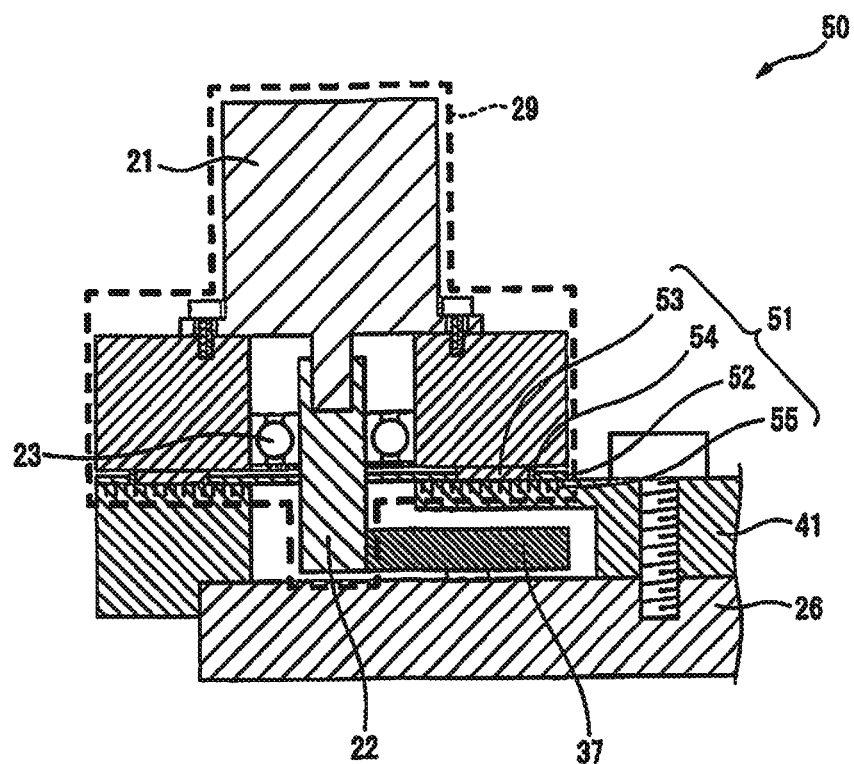
FIG. 5 is an enlarged cross-sectional view illustrating another modified example of the robot joint structure.

FIG. 5 is an enlarged cross-sectional view illustrating another modified example of a robot joint structure 40. The robot joint structure 50 of the present example is different from the robot joint structure 40 described above in that the moving mechanism 51 does not include a through hole and a fastening screw. Instead, the moving mechanism 51 includes a rail 52, a movable member 53 movable on the rail 52, a robot arm member 41 in which the unit structure 29 is slidably disposed by the rail 52 and the movable member 53, and a positioning member 54 configured to position the unit structure 29 on the robot arm member. The rail 52 is oriented so that the motor-side gear 22 approaches the mating gear 37. Thus, when the operator moves the unit structure 29, the motor-side gear 22 can be easily brought close to the mating gear 37. The positioning member 54 is a locking member that locks the movable member 53 so as not to move on the rail 52. The moving mechanism 51 may employ a ball screw configuration in which the rail 52 is configured as a screw shaft and the movable member 53 is configured as a nut movable on the screw shaft. The moving mechanism 51 may further include a scale 55 to indicate the position of the unit structure 29. Thus, the influence of backlash between the motor-side gear 22 and the mating gear 37 can be ascertained. The scale 55 may not be printed or engraved on the rail 52 or the like, but a dial gauge or the like may be used.

Figure 6:
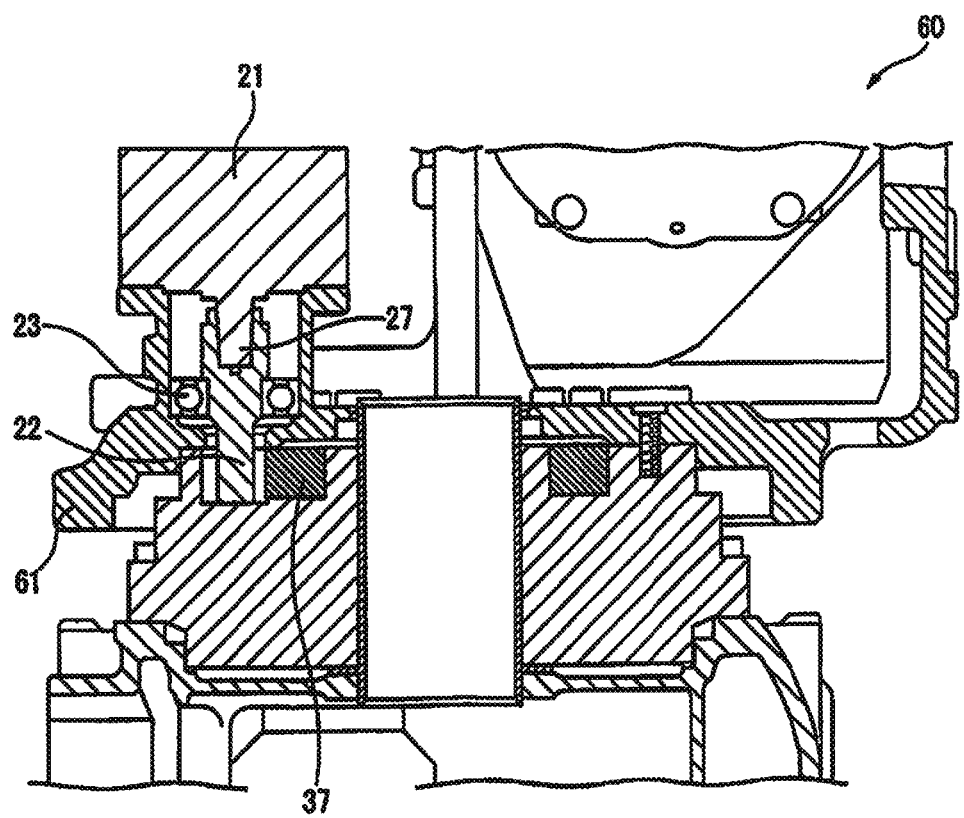
FIG. 6 is a cross-sectional view illustrating a comparative example of a robot joint structure.

FIG. 6 is a cross-sectional view illustrating a robot joint structure 60 of a comparative example. A robot joint structure 60 of the present example differs from the robot joint structures 20, 40 and 50 described above in that it does not include an adapter 24 that integrates the motor 21, the motor-side gear 22, and the auxiliary bearing 23. In the robot joint structure 60, since the auxiliary bearing 23 is mounted on the robot arm member 61, the rotational shaft position of the motor-side gear 22 mounted on the shaft 27 of the motor 21 cannot be adjusted. Therefore, the backlash between the motor-side gear 22 and the mating gear 37 cannot be reduced, and the robot trajectory accuracy decreases due to such backlash.

In contrast, according to the above-described robot joint structures 20, 40, and 50, even when the auxiliary bearing 23 is used for the motor 21 of the robot joint shaft, the unit structure 29 can be moved in the radial direction B of the motor, so that backlash between the motor-side gear 22 and the mating gear 37 is reduced, and the tracking accuracy of the robot 1 is improved. Consequently, the processing accuracy by the robot in a laser application, a sealing application, or the like is improved.

While various embodiments have been described herein, it should be appreciated that the present invention is not limited to the embodiments described above, and that various modifications can be made within the scope of the following claims.

The invention claimed is:

1. A robot joint structure of a robot having a first joint shaft and a second joint shaft, the robot joint structure comprising:
   a motor configured to turn the second joint shaft relative to the first joint shaft about a vertical axis parallel to gravity depending on an orientation of the robot where gravity does not act on gears of the first and second joint shafts;
   a motor-side gear mounted on a shaft of the motor;
   an auxiliary bearing configured to axially support the shaft and the motor-side gear supplementally;
   an adapter configured to integrate the motor, the motor-side gear, and the auxiliary bearing; and
   a moving mechanism configured to move a unit structure integrated by the adapter in a radial direction of the motor such that the motor-side gear approaches a mating gear meshing with the motor-side gear, wherein
   the adapter includes a hollow cylindrical portion which houses the shaft of the motor and the auxiliary bearing,
   the motor is attached by a bolt to the adapter,
   the auxiliary bearing is attached to an inner peripheral surface of the hollow cylindrical portion,
   the moving mechanism includes a robot arm member on which the unit structure is slidably disposed and positioned,
   the robot arm member includes a receiving groove configured to receive the adapter, and a bottom of the receiving groove faces an outer bottom surface of the adapter when the receiving groove receives the adapter, and
   an inner diameter of the receiving groove of the robot arm member is larger than a size obtained by adding a movement amount of the unit structure to an outer diameter of the hollow cylindrical portion of the adapter where the movement amount of the unit structure is related to an amount of backlash occurring when the second joint shaft turns relative to the first joint shaft about the vertical axis parallel to gravity.

2. The robot joint structure of claim 1, wherein the moving mechanism includes a through hole formed in the adapter and a fastening screw having an outer diameter smaller than an inner diameter of the through hole, and the unit structure is slidably disposed and positioned on the robot arm member by the fastening screw.

3. The robot joint structure of claim 2, wherein the robot arm member includes a sliding surface on which the unit structure slides.

4. The robot joint structure of claim 2, wherein
   the robot arm member includes an insertion hole through which the motor-side gear, which is integrated by the adapter, is inserted, and
   an inner diameter of the insertion hole is larger than a size obtained by adding a movement amount of the unit structure to an outer diameter of the motor-side gear.

5. The robot joint structure of claim 2, wherein the adapter further includes a flange circumferentially formed on one of open ends of the hollow cylindrical portion, and the through hole is formed in the flange.

6. The robot joint structure of claim 2, further comprising a speed reduction mechanism coupled to the robot arm member, wherein the mating gear is a gear of the speed reduction mechanism.

7. The robot joint structure of claim 2, wherein the robot arm member is a turning base.

8. The robot joint structure of claim 2, wherein the hollow cylindrical portion extends continuously without interruption from a first opening on a first end face of the adapter to a second opening on a second end face of the adapter, the first end face abutting the motor, the second end face facing the robot arm member.

9. The robot joint structure of claim 8, wherein the second end face abuts and is slidable on a sliding surface of the robot arm member.

10. The robot joint structure of claim 8, wherein the motor-side gear is attached to the shaft of the motor by a bolt.

11. The robot joint structure of claim 8, wherein, along an axial direction of the shaft of the motor, the fastening screw is longer than the hollow cylindrical portion.

12. The robot joint structure of claim 1, wherein the second joint shaft is a joint shaft of a vertical articulated robot, or is a joint shaft of a horizontal articulated robot.

13. The robot joint structure of claim 1, wherein the moving mechanism includes a rail, a movable member movable on the rail, a robot arm member on which the unit structure is slidably disposed by the rail and the movable member, and a positioning member configured to position the unit structure on the robot arm member.

14. A robot comprising the robot joint structure of claim 1.

15. A robot joint structure of a robot having a first joint shaft and a second joint shaft, the robot joint structure comprising:

a motor configured to turn the second joint shaft relative to the first joint shaft about a vertical axis parallel to gravity depending on an orientation of the robot where gravity does not act on gears of the first and second joint shafts;
a motor-side gear mounted on a shaft of the motor;
an auxiliary bearing configured to axially support the shaft supplementally;
an adapter configured to integrate the motor, the motor-side gear, and the auxiliary bearing; and
a moving mechanism configured to move a unit structure integrated by the adapter in a radial direction of the motor such that the motor-side gear approaches a mating gear meshing with the motor-side gear, wherein
the moving mechanism includes:
a through hole formed in the adapter,
a fastening screw having an outer diameter smaller than an inner diameter of the through hole, and
a robot arm member on which the unit structure is slidably disposed and is positioned by the fastening screw,
the robot arm member includes a receiving groove configured to receive the adapter,
the adapter includes:
a hollow cylindrical portion, which houses the shaft of the motor and the auxiliary bearing, and
a flange circumferentially formed on one of open ends of the cylindrical portion, wherein the received portion is the cylindrical portion and the through hole is formed in the flange,
the motor is attached by a bolt to the adapter, and the auxiliary bearing is attached to an inner peripheral surface of the cylindrical portion,
a bottom of the receiving groove of the robot arm member faces an outer bottom surface of the adapter when the receiving groove receives the adapter, and
an inner diameter of the receiving groove of the robot arm member is larger than a size obtained by adding a movement amount of the unit structure to an outer diameter of the hollow cylindrical portion of the adapter where the movement amount of the unit structure is related to an amount of backlash occurring when the second joint shaft turns relative to the first joint shaft about the vertical axis parallel to gravity.

16. A robot joint structure, comprising:
a motor configured to be used for a robot joint shaft;
a motor-side gear mounted on a shaft of the motor;
an auxiliary bearing configured to axially support the shaft and the motor-side gear supplementally;
an adapter configured to integrate the motor, the motor-side gear, and the auxiliary bearing; and
a moving mechanism configured to move a unit structure integrated by the adapter in a radial direction of the motor such that the motor-side gear approaches a mating gear meshing with the motor-side gear, wherein
the adapter includes a hollow cylindrical portion which houses the shaft of the motor and the auxiliary bearing,
the motor is attached by a bolt to the adapter,
the auxiliary bearing is attached to an inner peripheral surface of the hollow cylindrical portion,
the moving mechanism includes a robot arm member on which the unit structure is slidably disposed and positioned,
the robot arm member includes a receiving groove configured to receive the adapter, and a bottom of the receiving groove faces an outer bottom surface of the adapter when the receiving groove receives the adapter,
an inner diameter of the receiving groove of the robot arm member is larger than a size obtained by adding a movement amount of the unit structure to an outer diameter of the hollow cylindrical portion of the adapter,
the moving mechanism includes a through hole formed in the adapter and a fastening screw having an outer diameter smaller than an inner diameter of the through hole, and the unit structure is slidably disposed and positioned on the robot arm member by the fastening screw,
the hollow cylindrical portion extends continuously without interruption from a first opening on a first end face of the adapter to a second opening on a second end face of the adapter, the first end face abutting the motor, the second end face facing the robot arm member, and
the second end face faces and is spaced from a surface of the robot arm member.

* * * * *